United States Patent [19]

Blasko

[11] Patent Number: 4,888,453
[45] Date of Patent: Dec. 19, 1989

[54] PANEL MOUNTED BREAKOUT FITTING

[75] Inventor: Raymond J. Blasko, Poland, Ohio

[73] Assignee: General Motors Corporation, Detroit, Mich.

[21] Appl. No.: 260,273

[22] Filed: Oct. 20, 1988

[51] Int. Cl.⁴ ............................................. H02G 3/02
[52] U.S. Cl. ................................. 174/135; 174/71 R; 174/72 A; 174/15.3 G; 248/56
[58] Field of Search ................... 174/71 R, 72 A, 135, 174/153 G; 16/2; 248/56; 439/557, 558

[56] References Cited

U.S. PATENT DOCUMENTS

| | | | |
|---|---|---|---|
| 2,891,103 | 6/1959 | Swengel | 174/153 G |
| 2,982,939 | 5/1961 | Kirk | 439/558 |
| 3,711,633 | 1/1973 | Ghirardi | 174/135 |

Primary Examiner—Laramie E. Askin
Attorney, Agent, or Firm—F. J. Fodale

[57] ABSTRACT

A thermoplastic breakout fitting is attached to an axially slit corrugated conduit which houses a plurality of electrical leads. The breakout fitting has first and second portions which comprise semitubular bases which are attached to each other by an integral flexible hinge at a longitudinal side edge of the semitubular bases so that the portions can be closed about the corrugated conduit. The hinged portions have a collar and a closure which form a housing which communicates with the corrugated conduit for receiving breakout leads which are passed through an aperture through a panel. The collar is attached to the panel by a flange of the collar which engages one side ot the panel, a pilot ring which supports the collar in the aperture in the radial direction, and a plurality of circumferentially spaced deflectable lock arms which have catches at their free ends which engage the opposite side of the panel.

4 Claims, 2 Drawing Sheets

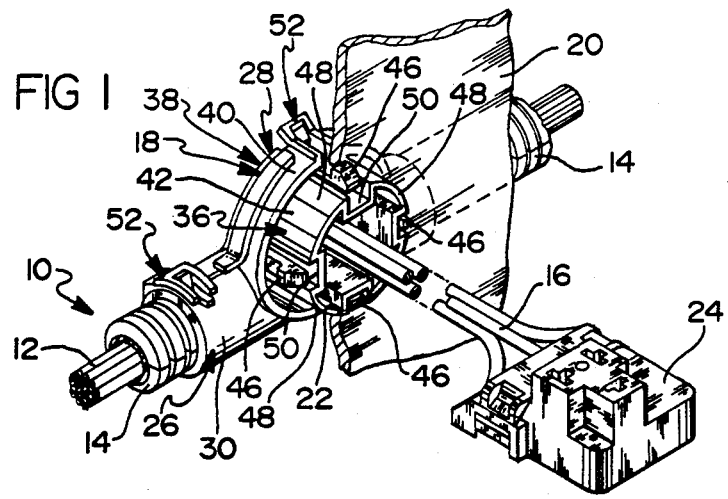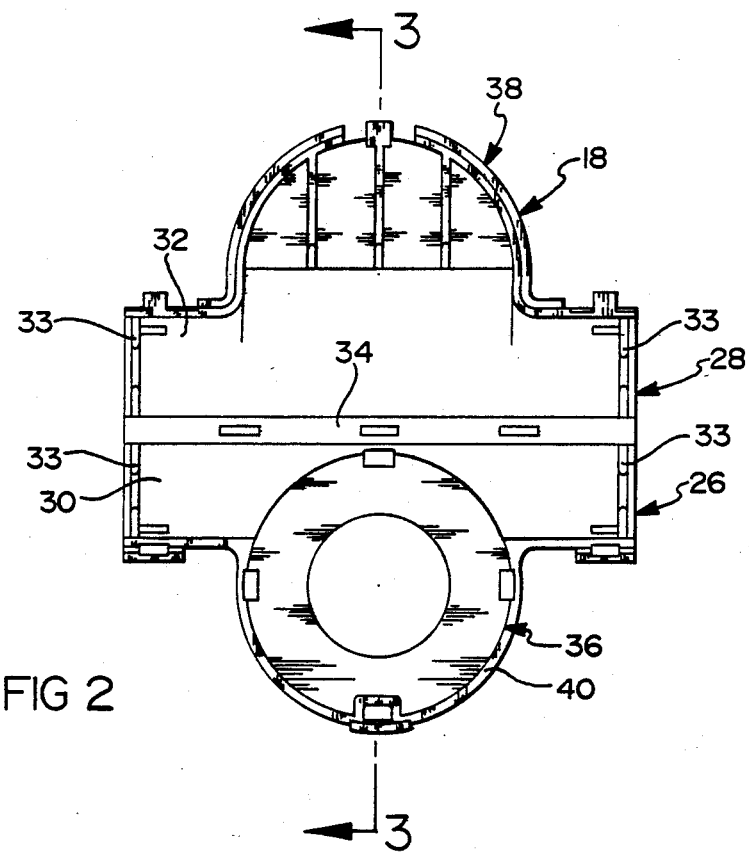

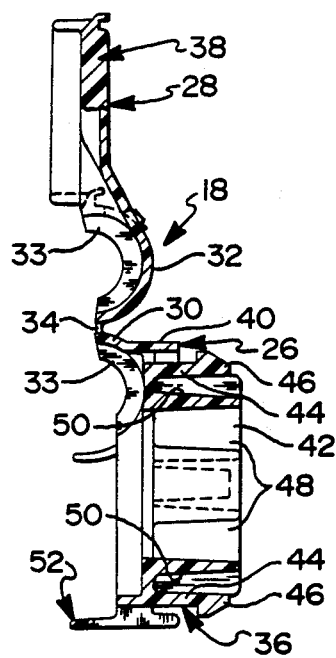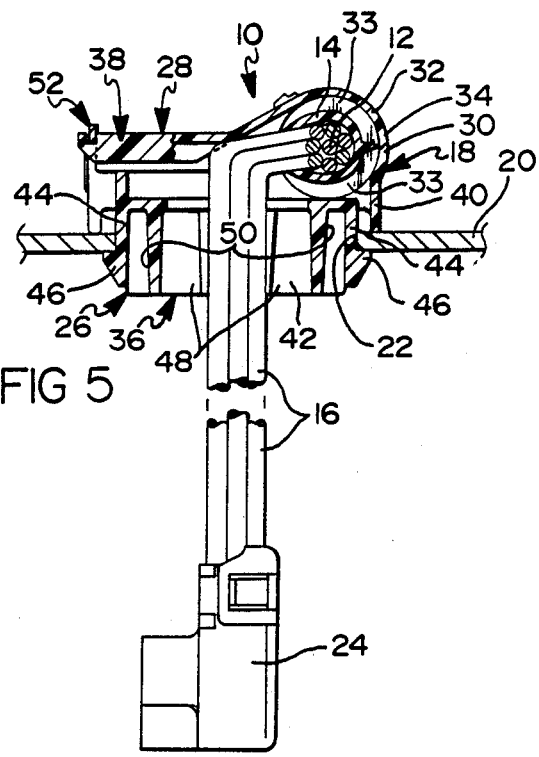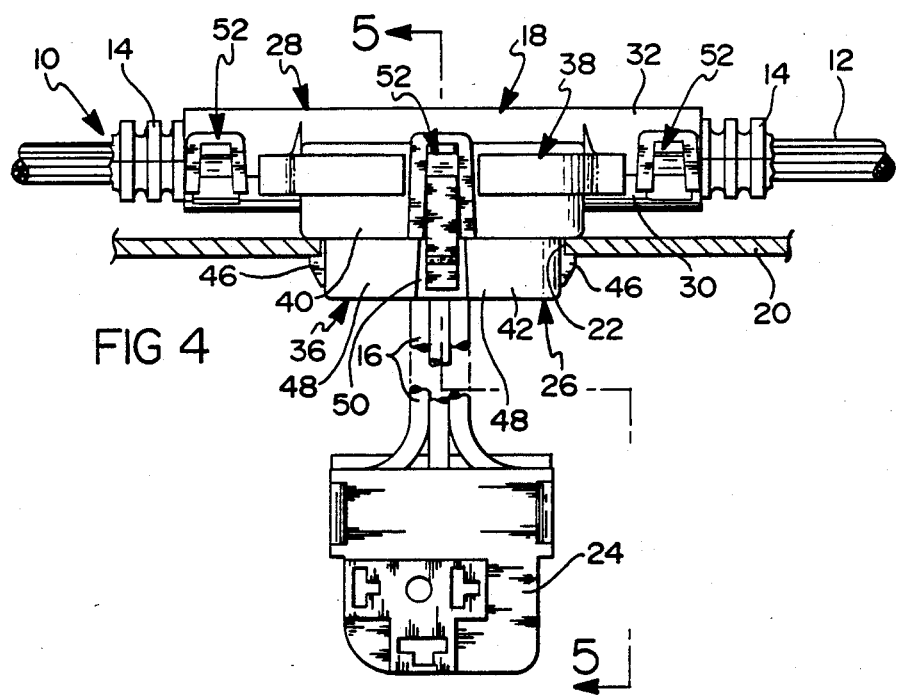

PANEL MOUNTED BREAKOUT FITTING

BACKGROUND OF THE INVENTION

This invention relates generally to breakout fittings for flexible, thermoplastic, axially slit corrugated conduits which are used in wiring harnesses to house a plurality of electrical leads and more specifically to breakout fittings which allow for a select number of the electrical leads to pass out of the corrugated conduit via the axial slit.

U.S. Pat. No. 3,711,633, which issued to Paul S. Ghirardi and Eugene V. McGowan Jan. 16, 1973 and which is assigned to the assignee of this invention, discloses several breakout fittings for flexible, thermoplastic, axially slit corrugated conduits used in wiring harnesses. These breakout fittings 20, 60, 90 comprise a pair of sections 22, 24; 66, 68; 92, 94 which are integrally hinged by a web 26, 70, 96 and which are latched in a closed position around the corrugated conduit by releasable latch means 34, 74, 116.

While these breakout fittings have been used successfully for many years in many applications, the breakout fittings are not particularly well suited for use in a pass through application where the electrical breakout leads are passed through an aperture in a panel. An example of such an application is an automotive lighting harness which is located in the engine compartment and which has electrical breakout leads for the headlamps which are inserted through apertures in the back of the headlamp pod housings.

SUMMARY OF THE INVENTION

The object of this invention is to provide a breakout fitting for flexible thermoplastic, axially slit corrugated conduits which is particularly well suited for a pass through application.

Another object of this invention is to provide a breakout fitting for a pass through application which mounts securely on the panel which the breakout leads pass through.

Still another object of this invention is to provide a thermoplastic housing having panel mounting structure which is inserted into an aperture through the panel and secured to adjacent portions of the panel while allowing electrical wires from the thermoplastic housing to pass through the panel aperture.

Other objects and features of the invention will become apparent to those skilled in the art as disclosure is made in the following detailed description of a preferred embodiment of the invention which sets forth the best mode of the invention contemplated by the inventor and which is illustrated in the accompanying sheets of drawing.

BRIEF DESCRIPTION OF THE DRAWINGS

FIG. 1 is a perspective view of a wiring harness which is secured to a panel by a breakout fitting in accordance with the invention.

FIG. 2 is a top view of the breakout fitting which is shown in FIG. 1. The breakout fitting is shown in the open position.

FIG. 3 is a section taken substantially along the line 3—3 of FIG. 2 looking in the direction of the arrows.

FIG. 4 is a longitudinal view of the wiring harness and breakout fitting which is shown in FIG. 1.

FIG. 5 is a section taken substantially along the line 5—5 of FIG. 4 looking in the direction of the arrows.

DETAILED DESCRIPTION OF THE PREFERRED EMBODIMENT

Referring now to Figures 1, 4 and 5 of the drawing an automotive wiring harness 10, such as the lighting harness which is located in the engine compartment, comprises a bundle or plurality of electrical leads 12 which are housed in a flexible, thermoplastic, axially slit, corrugated conduit 14. The wiring harness 10 further comprises a select number of breakout leads 16 from the bundle of leads 12 which pass out of the corrugated conduit 14 through its axial slit and a thermoplastic breakout fitting 18 which accommodates the breakout leads 16. The breakout fitting 18 is mounted on a panel 20, such as the back of a headlamp pod housing, having an aperture 22 through which the breakout leads 16 pass. The breakout leads 16 have an electrical end connector 24 which connects the breakout leads 16 to an electrical device such as a headlamp (not shown). The end connector 24 is sized to fit through the aperture 22.

The breakout fitting 18 comprises first and second portions 26 and 28 which are adapted to be attached to the corrugated conduit 14 at longitudinally spaced locations so that a number of the electrical leads 12 can be passed from the corrugated conduit through its axial slit between the longitudinally spaced locations where the breakout fitting 18 is attached to the corrugated conduit 14.

The portions 26 and 28 comprise semitubular bases 30 and 32 which are attached to each other by an integral flexible hinge 34. The flexible hinge 34 is at a longitudinal side edge of the semitubular bases 30 and 32 so that the semitubular bases 30 and 32 are pivotal about the hinge 34 from an open position shown in FIGS. 2 and 3 to a closed position. In the closed position the semitubular bases 30 and 32 surround the corrugated conduit 14 as shown in FIGS. 1, 4 and 5.

The semitubular bases 30 and 32 have semicircular ribs 33 at each end which extend radially inwardly. The ribs 33 protrude between adjacent corrugations of the corrugated conduit 14 in the closed position to attach the breakout fitting 18 to the corrugated conduit 14 at the longitudinally spaced locations determined by the semicircular ribs 33.

Portion 26 of the breakout fitting 18 has a collar 36 integrally attached to its semitubular base 30 while the portion 28 has a closure 38 integrally attached to its semitubular base 32. The collar 36 and the closure 38 form a housing which communicates with the corrugated conduit 14 for receiving the breakout leads 16 when the semitubular bases 30 and 32 are in the closed position surrounding the corrugated conduit 14 as shown in FIG. 5.

The breakout fitting 18 further includes panel mounting means associated with the collar 36 which is inserted into the aperture 22 of the panel 20. The panel mounting means comprises a flange 40 of the collar 36 which engages the entrance side of the panel 20 outwardly of the aperture 22 and a pilot ring 42 which is located inwardly of the flange 40 and which supports or locates the collar 36 in the aperture 22 in the radial direction. The panel mounting means further comprises a plurality of circumferentially spaced deflectable lock arms 44 which are attached to the collar 36 in cantilever fashion between the flange 40 and the pilot ring 42. The lock arms 44 have catches 46 at their free ends which engage the exit side of the panel 20 outwardly of the aperture 22 to secure the breakout fitting 18 to the panel 20 in cooperation with the flange 40 and pilot ring 42

The pilot ring 42 comprises a plurality of arcuate portions 48 which serve to pilot the collar in the aperture and a plurality of recessed portions 50 which connect the ends of the pilot portions 48 as best seen in FIG. 1. The lock arms 44 are partially nested in a spaced relationship in the recessed portions 50 which serve to limit the inward deflection and consequent internal stresses of the lock arms 44 as the lock arms pass through the aperture 22 to engage the exit side of the panel 20.

The breakout fitting 18 is retained in the closed position by cooperating latch means 52 at the ends of the semitubular portions 30 and 32 and at a radial end of the collar 36 and the closure plate 38 which is remote from the hinge 34 joining the semitubular portions 30 and 32.

It is to be understood that the invention is not limited to the exact details of construction shown and described, for obvious modifications will occur to a person skilled in the art.

The embodiments of the invention in which an exclusive property or privilege is claimed are defined as follows:

1. A thermoplastic breakout fitting for use with corrugated conduit which houses a plurality of electrical leads comprising:

first and second portions which are adapted to be attached to corrugated conduit at longitudinally spaced locations so that a select number of the electrical leads can be passed from the corrugated conduit between the longitudinally spaced locations where the first and second portions are attached to the corrugated conduit, the first and second portions comprising semitubular bases which are attached to each other by an integral flexible hinge at a longitudinal side edge of the semitubular bases so that the semitubular bases can be pivoted about the hinge from an open position to a closed position where the semitubular bases are adapted to surround the corrugated conduit, the first portion having a collar integrally attached to the semitubular base of the first portion and the second portion having a closure integrally attached to the semitubular base of the second portion, the collar and the closure forming a housing which communicates with the corrugated conduit for receiving the breakout leads and directing the breakout leads through the collar when the semitubular bases are in a closed position surrounding the corrugated conduit, and means to attach the collar to a panel having a through aperture comprising a flange for engaging one side of the panel outwardly of the aperture, a pilot ring inwardly of the flange for supporting the collar in the aperture in the redial direction, and a plurality of circumferentially spaced deflectable lock arms which are attached to the collar in cantilever fashion between the flange and the pilot ring, the lock arm having catches at their free ends for engaging the opposite side of the panel outwardly of the aperture to securely mount the breakout fitting on the panel, and the pilot ring including portions which limit the inward deflection of the lock arms as the lock arms pass through the aperture to engage the opposite side of the panel.

2. The thermoplastic breakout fitting as defined in claim 1 wherein the pilot ring comprises a plurality of arcuate portions to pilot the collar in the aperture and a plurality of recessed portions which connect the ends of the arcuate portions and which constitute said portions which limit the inward deflection of the lock arms as the lock arms pass through the aperture to engage the opposite side of the panel.

3. The thermoplastic breakout fitting as defined in claim 2 wherein the first and second portions are retained in the closed position by cooperating latch means at the ends of the semitubular portions and at a radial end of the collar and the closure which is remote from the hinge joining the semitubular portions.

4. A thermoplastic housing for passing leads through an aperture in a panel comprising;

a collar for the leads to pass out of the housing and means to attach the collar to the panel;

the means comprising a flange for engaging a side of the panel outwardly of the aperture, a pilot ring inwardly of the flange which has a plurality of arcuate portions for supporting the collar in the aperture in the radial direction, and a plurality of circumferentially spaced deflectable lock arms which are attached to the collar in cantilever fashion between the flange and the pilot ring, the lock arms having catches at their free ends for engaging the opposite side of the panel outwardly of the aperture to secure the housing to the panel, and the pilot ring having a plurality of recessed portions which connect the ends of the arcuate portions and which limit the inward deflection of the lock arms as the lock arms pass through the aperture to engage the opposite side of the panel.

* * * * *